COARSE AND FINE HEAD POSITIONING APPARATUS FOR RANDOM ACCESS DISC MEMORY SYSTEM

Filed April 17, 1963 2 Sheets-Sheet 1

INVENTORS
BYRON D. SMITH
ROBERT R. REISINGER
BY Kenway, Jenney + Hildreth
ATTORNEYS INVENTORS
BYRON D. SMITH
ROBERT A. REISINGER
BY Kenway, Jenney & Hildreth
ATTORNEYS 3,298,008

COARSE AND FINE HEAD POSITIONING APPARATUS FOR RANDOM ACCESS DISC MEMORY SYSTEM

Byron D. Smith, Edina, and Robert R. Reisinger, Mahtomedi, Minn., assignors to ANelex Corporation, Boston, Mass., a corporation of New Hampshire Filed Apr. 17, 1963, Ser. No. 273,694
6 Claims. (Cl. 340—174.1)

Figure 1:
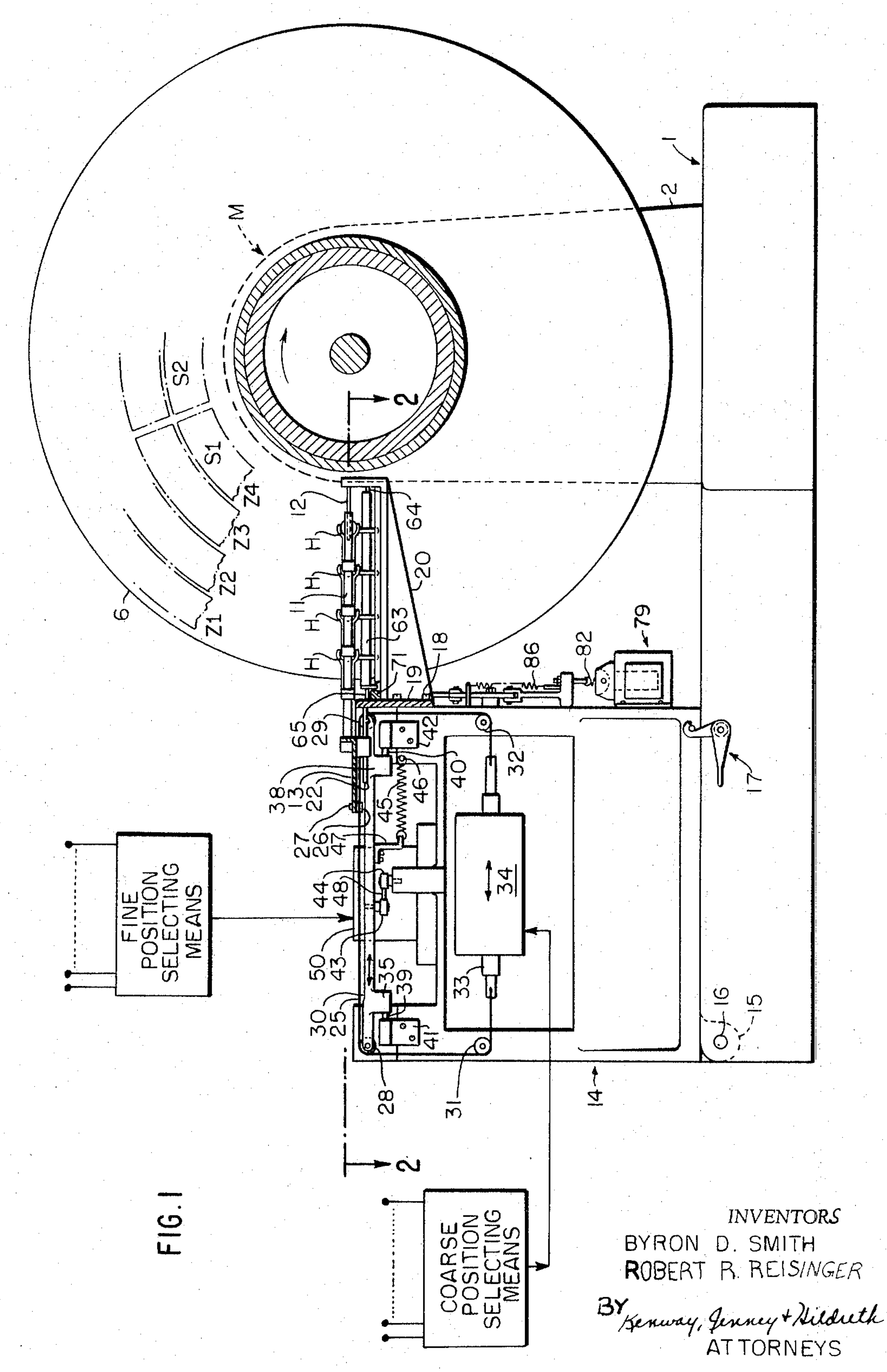

Our invention relates to shaft positioning means, and particularly to an improved linear positioning system for moving the magnetic transducer heads of a random access disc memory system to selected recording tracks with a high degree of accuracy and reproducibility.

In random access memory systems of the type employing magnetic recording discs, information is stored and retrieved by use of transducer heads, which are moved to selected positions adjacent the recording surface of a magnetically coated metal disc to enter or retrieve information on predetermined radially displaced recording tracks. The radial displacement which must be allowed between the tracks on a recording disc used for this purpose is determined, not only by the width that must be used for reading, writing and erasing a record on a given track, but by the accuracy with which the transducer heads may be moved to a selected track. Since it is desirable to have as many tracks serviced by a single transducer head as possible, it is consequently desirable to have the total range of movement of a given transducer head large with respect to the distances between adjacent tracks.

A problem which arises in devising positioning apparatus for such heads is that it is quite difficult to make a single positioning device capable of moving accurately over a small increment for a total travel of a large number of increments. One approach to the solution of this problem has been to employ both fine and coarse positioning devices, in combination with displacement summing means which will produce an output motion that is the sum of the coarse and fine input displacements. However, if the coarse positioning device is not capable of producing exactly equal increments of movement over its entire range, cumulative errors may result, which may cause the fine positions to overlap in some portions of the range. It is the object of our invention to improve the accuracy with which a transducer head can be positioned with respect to a recording surface.

Briefly, transducer head positioning apparatus in accordance with our invention comprises an arm for carrying one or more transducer heads adjacent a recording disc, means for slidably supporting the arm for linear motion radially toward and away from the center of the recording disc, and a pair of digital positioning devices connected through a displacement summing device for moving the arm to any one of a selected number of positions with a minimum amount of space required for allowance for cumulative error in position owing to errors in the coarse positioning device. To this end, means are provided for reducing the displacement imparted by the fine positioning device over its total range of operation to a fraction of the displacement produced with each change of position of the coarse positioning device. In accordance with our invention, this fraction is such that the total travel of the arm produced by the fine positioner operating throughout its range, is less than the total movement imparted to the arm by one step of the coarse positioning device by an amount sufficient to compensate for easily obtainable tolerances in the coarse positioning device. The result of this construction is that a small interval is provided between each group of positions established by the fine positioner in a given position of the coarse positioner, which may be employed to correct for slight errors in each increment of the coarse positioner.

Our invention will best be understood by reference to the folowing detailed description, together with the accompanying drawings, of a preferred embodiment thereof.

Figure 2:
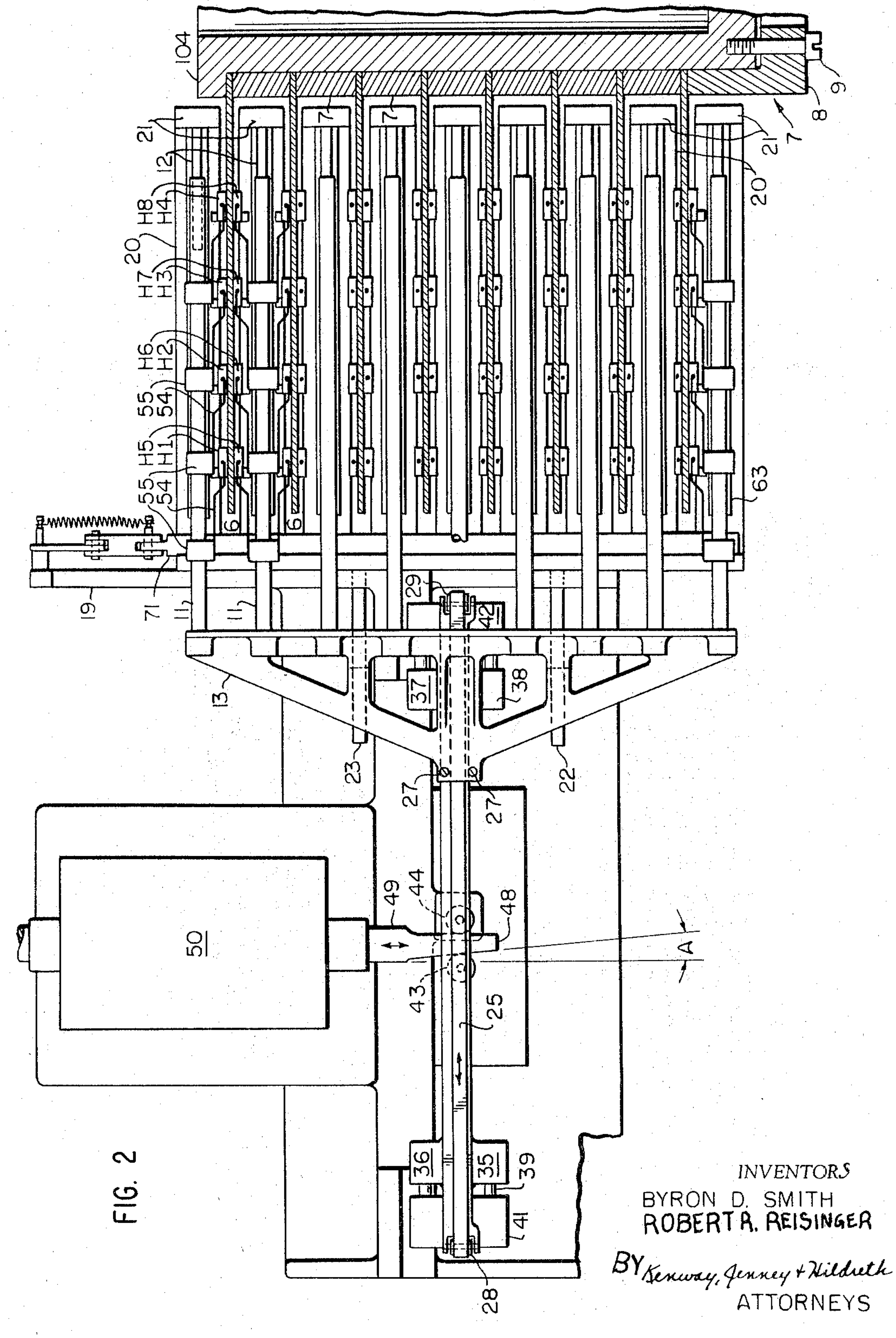

In the drawings,

FIGURE 1 is an elevational view, with parts shown in cross section, parts shown schematically, and parts broken away, of a random access disc memory system incorporating the transducer head positioning means of my invention; and FIGURE 2 is a plan view, with parts shown in cross section and parts broken away, and on an enlarged scale, of the apparatus of FIGURE 1.

Referring now to the drawings, we have shown a random access disc memory system comprising a base casting 1 on which a pedestal 2 is mounted. The pedestal 2 is formed integral with, or otherwise secured to at its upper end, the stator of an electric motor indicated at M, provided with a drive shaft 3. An outer concentric shaft 4 is secured to the drive shaft 3, as by an end flange 5 formed on the shaft 4 as suggested in FIGURE 2.

A series of magnetic recording discs 6 are mounted on the shaft 4 by means of clamping rings 7, and are secured by bolts such as the bolt 9, extending through an end flange portion 8 formed on the end clamping ring 7 and extending into threaded recesses in the shaft 4. The motor M is operated at constant speed, for example, at 1200 r.p.m., in the direction indicated by the arrow in FIGURE 1.

A plurality of magnetic transducer heads H are mounted by means of springs 54 on tubular arms 11, as best shown in FIGURE 2. The heads H may be connected electrically to suitable conventional apparatus, not shown, for recording, reproducing, and erasing information on the discs 6. The arms 11 are secured at one end to a bracket 13, and at the other end receive guide and support rods 12 which are secured to ledges 21 formed on the ends of a series of spoilers 20 which are mounted on a positioner support 14. The positioner support 14 is pivoted to the base casting 1 by means of lugs 15 on the positioner support and an axle 16 connected to the base. A manually actuable latch 17 is provided for holding the positioner support firmly on the base 1 when the apparatus is in use. As shown, the bracket 13 is provided with depending lugs 24 which are apertured to receive guide rods 22, secured to a spoiler support plate 19 formed integral with the spoilers 20 and bolted to the positioner support 14.

The apparatus just described is more fully described in co-pending U.S. application Serial Number 273,597, filed on the same day as the present application by Eugene G. Domich and Robert R. Reisinger for Head Mounting and Positioning Means for Random Access Memory Systems. The positioning apparatus next to be described, which constitutes the subject matter of our invention, is mounted on the positioner support 14 and is adapted to move the bracket 13 carrying the arms 11 radially with respect to the discs 6, to position each of the heads to any one of a predetermined number of tracks.

As indicated in FIGURE 1, there are conveniently four heads on each arm, although any other desired number may be provided if desired. Each head cooperates with a recording area consisting of a radial zone such as the zones Z1, Z2, Z3 and Z4. Within each zone there may be located a selected number of tracks; in one practical embodiment of our invention, one hundred tracks were provided. In accordance with this embodiment of our invention, the width of each zone was approximately 1.8 inches, and 100 tracks were spaced in groups of 10 within this area.

The bracket 13 is connected to a tape 25, of stainless steel or the like, by means of a plate 26 and the screws 27, as shown in FIGURES 1 and 2. The ends of the tape 25 are connected to the ends of the output shaft 33 of a coarse positioning unit 34. Intermediate its ends, the tape 25 passes over a first pair of rolls 28 and 29, which are journaled in an arm 30, and a second pair of rolls 31 and 32, which are journaled in the positioner support 14.

The arm 30 is provided with depending lugs 35, 36, 37 and 38, which are apertured to receive guide and support shafts such as 39 and 40. The shafts such as 39 and 40 are secured to brackets such as 41 and 42, respectively, which are mounted on the positioner support 14. Sufficient lateral sliding movement of the arm 30, on the shafts such as 39 and 40, is provided to allow somewhat more than the total range of movement of the bracket 13 required to cover a zone on the disc 6.

A first roller 43 is journaled in the arm 30 for rotation about a vertical axis, and a second roller 44 is journaled in the support 14 for rotation about a parallel axis. The arm 30 is urged to the right in FIGURE 1 by a spring 45, connected between a pin 46 mounted in the support 14 and a bracket 47 connected to the arm 30. Thus, the arm 30 is resiliently urged to the right in FIGURE 1. The rollers 43 and 44 are separated by a tapered extension 48 on the positioning shaft 49 of a fine positioner 50.

The coarse positioner 44 and the fine positioner 50 may be of the same construction, and both may be constructed in the manner shown and described in U.S. Patent Number 2,054,806 to Eugene S. Bush, for Electromagnetic Control Device, which issued on September 22, 1936. The embodiment shown in FIGURE 4 of the Bush patent may be employed, except that it is preferred to replace the mechanical actuating means comprising the lever 126 in FIGURE 4 of Bush by electrical or electromechanical means for selecting pairs of contacts for connection to the source of potential. In one practical embodiment of our invention ten positions were provided for each of the positioners 34 and 50. For this purpose, ten pairs of terminals 118 in the Bush patent would be required.

As schematically indicated, coarse position selecting means are provided for adjusting the positioner 50 to a desired position, and fine position selecting means are provided for adjusting the fine positioner 50. The selective emergization of the terminals of the positioner 34 and 50 by the selecting means can be carried out in any conventional manner known in the art; for example, ten relays could be selected for energization by energizing one of ten output address lines, corresponding to the terminals shown on the coarse and fine position selecting means, and contacts on the relays can be provided to connect the appropriate terminals of the positioners 34 and 50 to a suitable source to provide for 10 actuated positions of the armature 116 of the Bush apparatus, which would be connected to the output shaft 33 of the positioner 34 of my apparatus, or to the output shaft 49 of the positioner 50 in FIGURE 2. Other conventional electrical and electromechanical means for suitably selecting and energizing the appropriate terminals of the positioner will readily occur to those skilled in the art.

It will be apparent from the above description that the movement of the output shaft of the coarse positioner 34 will move the tape 25 to translate the bracket 13 and the arms 11 laterally in FIGURE 1 over a range determined by the number of positions of the positioner and the distance between positions. As an example, in one embodiment of our invention, ten positions were employed for the positioners 34 and 50, and each position was displaced from the next by 0.2 inch. Thus, the total range of travel of the shaft 33 was 1.8 inches.

Referring to FIGURE 2, it will be seen that vertical movement of the output shaft 49 of the fine positioner 50 in FIGURE 2 will result in a horizontal translation of the arm 30 as seen in FIGURE 2. The angle A, at which the portion 48 of the arm of the output shaft 49 is tapered, is selected so that, if the positioner 34 has $m$ positions, each separated by a distance $p$, and the positioner 50 has $n$ positions, each separated by a distance $s$, then: $\tan A<P/(M-1)s$.

Stated in terms of the movements imparted to the arms 11, if the coarse positioner has $m$–1 steps of $p$ inches each, for a total of $m$ positions, and the fine positioning means, comprising the tapered shaft extension 48, the arm 30, and the fine positioner 50 has $n-1$ steps of $p/a$ inches, for a total of $n$ positions, then $(n-1)/a$ should be less than 1, where $a$ is a number selected in accordance with the amount of tolerance it is desired to allow. In practice, for example, in one embodiment of our invention where each positioner had 10 positions, each separated by 0.2 inch, the angle A was selected such that 1/11th of the movement of the fine positioner output shaft 49 was transmitted to the arms 11. Thus, the coarse positioner would move the arms 0.2 inch at each step, and the fine positioner could select 10 positions for each position of the coarse positioner each separated by approximately .018 inch. With this arrangement, a safety band of approximately .02 inch was available at each end of each group of ten tracks to allow for slight cumulative errors in the increments of position applied by the coarse positioner.

Having described the structure of the preferred embodiment of our invention, its operation will next be described. First, the motor M is brought up to constant speed with the heads H retracted in the manner described in detail in the application of Domich and Reisinger referred to above. The heads are then actuated to their operative positions, in which they are maintained adjacent the surfaces of the associated discs by aerodynamic action, in the manner known in the art.

A selected track may then be addressed by making electrical connections, not shown, to a selected head by means described in somewhat more detail in the Domich and Reisinger application referred to above, and known in the art. The selected head is positioned adjacent to the particular track desired by energizing the positioners 34 and 50, by simultaneously applied signals to their terminals to cause them to move to a desired position. If each of the positioners has 10 positions, a total of 100 tracks may be selected by appropriately actuating the positioners. The summing means comprising the tape 25 in the parallelogram linkage shown in FIGURE 1 then adds the displacement of the output shaft 33 of the positioner 34 to the displacement produced by the movement of arm 30 in response to the movement of the output shaft 49 of the positioner 50. The tapered portion 48 of the shaft 49 spreads, or allows to come closer together, the rollers 43 and 44, carrying the arm 30 and translating the tape 25 independently of the motion of the output shaft 33 of the positioner 34. The bracket 13 and the arms 11 are thereby moved to the desired position to place the selected head H adjacent the desired track on its associated disc surface.

While we have described the positioning apparatus of our invention with reference to a specific displacement summing means, it is within the scope of my invention, in its broader aspects, to employ other summing devices known to the art. In addition, the description of invention in terms of the details of a preferred embodiment will suggest many changes and variations to those skilled in the art, and such can obviously be made without departing from the scope of our invention.

Having thus described our invention, what we claim is:

1. Apparatus for positioning a magnetic transducer head adjacent selected radially displaced tracks on a magnetic recording disc journaled on a support for rotation about a selected axis, comprising an arm on which the head is mounted, means slidably mounting the head on the support for motion in a path carrying the head radially across the surface of the disc over a predetermined distance, displacement summing means for moving the arm in response to the sum of two applied displacements, first digital positioning means having $m$ actuated positions successively displaced by $p$ units of length for applying a selected displacement in the range of 0 to $(m-1)p$ to the summing means, where $(m-1)p$ equals the predetermined distance, and second digital positioning means having $n$ actuated positions successively displaced by $p/a$ units of length for applying a selected displacement in the range of 0 to $(n-1)p/a$ to the summing means, where $a$ is a number selected to make $(n-1)/a<1$.

2. In combination, a magnetic recording disc journaled on a support for rotation about a selected axis, an arm slidably mounted on said support for linear movement on a line intersecting said axis and normal thereto, a magnetic transducer head mounted on said arm adjacent the surface of said disc, first positioning means having an output element selectively operable to any one of $m$ positions, including $m-1$ positions successively displaced from a reference position by a distance $p$, second positioning means having an output element selectively operable to any one of $n$ positions, including $n-1$ positions successively displaced from a reference position by a distance of $p/a$, where $(n-1)/a<1$ and $n>1$, and displacement summing means controlled by said output elements for moving said arm a distance equal to the sum of the displacement of said output elements from their reference positions.

3. In combination, a magnetic recording disc journaled on a support for rotation about a selected axis, an arm slidably mounted on said support for movement radially of said disc, a magnetic transducer head mounted on said arm adjacent the surface of said disc, displacement summing means comprising two displaceable input elements connected to an output element for displacing the output element a distance corresponding to the sum of the displacements of the input elements, fine positioning means selectively operable to a predetermined number of successively displaced positions over a predetermined distance and connected to one of said input elements for displacing it a distance corresponding to its operated position, and coarse positioning means selectively operable to a predetermined number of positions successively displaced by a distance greater than the predetermined distance and connected to the other input element for displacing it a distance corresponding to its operated position.

4. In combination, a support, a recording disc rotatably mounted on said support, a first arm carrying a transducer head slidably mounted on said support for radial movement of said head adjacent the surface of said disc, first digital positioning means mounted on said support and comprising an output shaft selectively operable to one of $m$ positions successively displaced by a distance $p$, a flexible inextensible band having its ends connected to said output shaft, and being connected intermediate its ends to said first arms, said band extending around four rollers in a quadrilateral array, two of said rollers being journaled in said support, a second arm, means journaling the other rollers at opposite ends of the second arm, means slidably mounting said second arm on said support for movement translating said first arm independently of the position of said output shaft, and means comprising a second digital positioning means mounted on said support and having an output shaft selectively operable to one of $n$ positions successively displaced by a distance $s$ in a direction normal to the direction of movement of said second arm, said output shaft having a tapered portion contacting said second arm for movement thereof in a first sense, said tapered portion comprising a surface inclined to the direction of movement of the output shaft of said second positioning means by an angle A, where $\tan A=p/(m-1)s$.

5. In a random access storage system, in combination, a recording disc rotatably journalled on a support, a transducer adjustably mounted on said support for radial movement on said disc and in proximity thereto for responding to information recorded on radially spaced tracks on said disc, first positioning means actuable to $m$ positions $p$ units of length apart, second positioning means actuable to $n$ positions $p/a$ units of length apart, where $(n-1)/a<1$, and motion accumulating means connected to said transducer and responsive to the positions of said first and second positioning means for adjusting said transducer to one of $mn$ positions selected by the positions of said positioning means.

6. Apparatus of the class described, comprising, in combination, a recording element having a recording surface, a transducer adjustably mounted for movement across said surface and in operative proximity thereto, first positioning means actuable to $m$ positions $p$ units of length apart, second positioning means actuable to $n$ positions $p/a$ units of length apart, where $(n-1)/a<1$, and motion accumulating means connected to said transducer and responsive to the positions of said first and second positioning means for adjusting said transducer to one of $mn$ positions selected by the positions of said positioning means.

References Cited by the Examiner

UNITED STATES PATENTS

| | | | |
|---|---|---|---|
| 3,007,144 | 10/1961 | Hagopian | 340—174.1 |
| 3,034,111 | 5/1962 | Hoagland et al. | 340—174.1 |

JAMES W. MOFFITT, *Acting Primary Examiner.*

A. I. NEUSTADT, *Assistant Examiner.*